US011490323B2

(12) United States Patent
Xiao et al.

(10) Patent No.: US 11,490,323 B2
(45) Date of Patent: Nov. 1, 2022

(54) METHOD AND DEVICE FOR ACCESSING A NETWORK HOTSPOT DEVICE BY AN UNCONFIGURED DEVICE

(71) Applicant: ALIBABA GROUP HOLDING LIMITED, Grand Cayman (KY)

(72) Inventors: Yuezhen Xiao, Shanghai (CN); Zongfeng Zhang, Hangzhou (CN); Song You, Hangzhou (CN); Mingjun Zhang, Hangzhou (CN); Huanyu Zhan, Hangzhou (CN); Xiaodong Li, Hangzhou (CN); Yao Peng, Shenzhen (CN); Yongli Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 25 days.

(21) Appl. No.: 16/915,244

(22) Filed: Jun. 29, 2020

(65) Prior Publication Data

US 2020/0329424 A1 Oct. 15, 2020

Related U.S. Application Data

(63) Continuation of application No. PCT/CN2018/122997, filed on Dec. 24, 2018.

(30) Foreign Application Priority Data

Dec. 29, 2017 (CN) .......................... 201711481930.3

(51) Int. Cl.
*H04W 48/16* (2009.01)
*H04W 48/08* (2009.01)
(52) U.S. Cl.
CPC ........... *H04W 48/16* (2013.01); *H04W 48/08* (2013.01)

(58) Field of Classification Search
CPC ......................... H04W 12/041; H04W 36/0038
(Continued)

(56) References Cited

U.S. PATENT DOCUMENTS

2010/0165968 A1 7/2010 Shpak
2011/0235549 A1* 9/2011 Ahlers .................... H04L 41/08
370/255

(Continued)

FOREIGN PATENT DOCUMENTS

CN 104010352 A 8/2014
CN 104301891 A 1/2015
(Continued)

OTHER PUBLICATIONS

PCT International Search Report and Written Opinion dated Feb. 13, 2019, issued in corresponding International Application No. PCT/CN2018/122997 (8 pgs.).

(Continued)

*Primary Examiner* — Fabricio R Murillo Garcia
(74) *Attorney, Agent, or Firm* — Finnegan, Henderson, Farabow, Garrett & Dunner, LLP

(57) ABSTRACT

Embodiments of the present disclosure provide methods and devices for accessing a network hotspot device by an unconfigured device. The network hotspot device is configured to create a first hotspot and a second hotspot. The method can include reporting, by the unconfigured device, device information of the unconfigured device to one or more network hotspot devices through the first hotspot of the one or more network hotspot devices for sending the device information to a server. One or more user terminals corresponding to the one or more network hotspot devices sends a configuration request for the unconfigured device to the server, the server determines that the user terminal of which the configuration request is first received by the server is a (Continued)

target user terminal and sends a configuration response message to the target user terminal, the target user terminal enables the unconfigured device to access the second hotspot of a target network hotspot device corresponding to the target user terminal after receiving the configuration response message. The method can also include accessing, by the unconfigured device, the second hotspot of the target network hotspot device.

17 Claims, 10 Drawing Sheets

(58) Field of Classification Search
USPC .......................................................... 455/434
See application file for complete search history.

(56) References Cited

U.S. PATENT DOCUMENTS

| | | | |
|---|---|---|---|
| 2014/0269654 A1 | 9/2014 | Canpolat et al. | |
| 2016/0094537 A1 | 3/2016 | Zucker | |
| 2016/0302141 A1 | 10/2016 | Canpolat et al. | |
| 2017/0034123 A1* | 2/2017 | Ritmanich | ............. H04L 67/12 |
| 2018/0359699 A1* | 12/2018 | Strong | .................. H04W 24/02 |
| 2019/0215903 A1* | 7/2019 | Wu | ........................ H04W 80/10 |
| 2020/0068454 A1* | 2/2020 | Van Lieshout | ... H04W 36/0055 |
| 2020/0322798 A1* | 10/2020 | Wu | ....................... H04W 12/04 |

FOREIGN PATENT DOCUMENTS

| | | |
|---|---|---|
| CN | 104581747 A | 4/2015 |
| CN | 104902537 A | 9/2015 |
| CN | 105163372 A | 12/2015 |
| CN | 105246074 A | 1/2016 |
| CN | 105263175 A | 1/2016 |
| CN | 105474743 A | 4/2016 |
| CN | 105517012 A | 4/2016 |
| CN | 106358189 A | 1/2017 |
| CN | 106507330 A | 3/2017 |
| EP | 2824973 A1 | 1/2015 |
| WO | WO 2019/128906 A1 | 7/2019 |

OTHER PUBLICATIONS

First Search Report issued in corresponding Chinese Application No. 201711481930.3 dated Dec. 21, 2020 (3 pages).
Supplementary Search Report issued in corresponding Chinese Application No. 201711481930.3 dated Aug. 2, 2020 (2 pages).

* cited by examiner

```
┌─────────────────────────────────────────────────────────────────┐
│ The unconfigured device accesses the first hotspot of one or more network │
│ hotspot devices and sends device information of the unconfigured device to│
│ the one or more network hotspot devices. The one or more network hotspot  │
│  devices are used to send the device information to a server. One or more │
│  user terminals corresponding to the one or more network hotspot devices  │
│      are used to send a network configuration request message for the     │──101
│ unconfigured device to the server. The server is used to determine the user│
│    terminal as the target user terminal corresponding to the first received│
│      network configuration request message and send a network configuration│
│     response message to the target user terminal. The target user terminal is│
│       used to send the first configuration network start message to the   │
│                          unconfigured device                              │
└─────────────────────────────────────────────────────────────────┘
                                   │
                                   ▼
┌─────────────────────────────────────────────────────────────────┐
│   After receiving the first network start message, the unconfigured device │
│   uses the preset third hotspot access information to access the third hotspot│──302
│      of the target network hotspot device corresponding to the target user │
│                                 terminal                                  │
└─────────────────────────────────────────────────────────────────┘
                                   │
                                   ▼
┌─────────────────────────────────────────────────────────────────┐
│ The unconfigured device receives second hotspot access information for the │
│   second hotspot sent by the target network hotspot device through the third│──303
│                                  hotspot                                  │
└─────────────────────────────────────────────────────────────────┘
                                   │
                                   ▼
┌─────────────────────────────────────────────────────────────────┐
│   The unconfigured device uses the second hotspot access information to   │──304
│       access the second hotspot of the target network hotspot device      │
└─────────────────────────────────────────────────────────────────┘
```

FIG. 3

```
┌─────────────────────────────────────────────────────────────────┐
│ The unconfigured device accesses the first hotspot of the network hotspot │
│ device and sends device information of the unconfigured device to the │
│ network hotspot device. The network hotspot device is used to send the │
│ device information to the server. The user terminal corresponding to the ├─601
│ network hotspot device is used to send a network configuration request │
│ message to the server for the unconfigured device. The server is used to │
│ send a network configuration response message to the user terminal. The │
│ user terminal is used to send a first configuration network start message to │
│ the unconfigured device │
└─────────────────────────────────────────────────────────────────┘
                                   │
                                   ▼
┌─────────────────────────────────────────────────────────────────┐
│ After receiving the first configuration network start message, the │
│ unconfigured device uses the preset third hotspot access information to ├─602
│ access the third hotspot of the network hotspot device │
└─────────────────────────────────────────────────────────────────┘
                                   │
                                   ▼
┌─────────────────────────────────────────────────────────────────┐
│ The unconfigured device receives second hotspot access information for the ├─603
│ second hotspot sent by the network hotspot device through the third hotspot │
└─────────────────────────────────────────────────────────────────┘
                                   │
                                   ▼
┌─────────────────────────────────────────────────────────────────┐
│ The unconfigured device uses the second hotspot access information to ├─604
│ access the second hotspot of the network hotspot device │
└─────────────────────────────────────────────────────────────────┘
```

FIG. 6

METHOD AND DEVICE FOR ACCESSING A NETWORK HOTSPOT DEVICE BY AN UNCONFIGURED DEVICE

CROSS-REFERENCE TO RELATED APPLICATION

The present disclosure claims the benefits of priority to International Application No. PCT/CN2018/122997, filed on Dec. 24, 2018, which claims priority to Chinese Patent Application No. 201711481930.3 filed on Dec. 29, 2017, both of which are incorporated herein by reference in their entireties.

BACKGROUND

With the development of the Internet of Things, more and more smart devices use Wi-Fi to access home routers to realize functions such as remote device control and scene linkage in smart home scenarios.

However, after many smart devices are installed in the user's home, the user often times forgets to configure them to the network, or is unclear how to configure them to the network. As a result, many smart devices are not connected to the network, and the value of the smart devices is not fully utilized.

At the same time, in the existing configuration network solutions in the market, when there are multiple users configuring the network at the same time, the problem of configuration errors is prone to occur.

SUMMARY

Embodiments of the present disclosure provide methods and devices for accessing a network hotpot device by an unconfigured device. The network hotspot device creates a first hotspot and a second hotspot. The method can include: reporting, by the unconfigured device, device information of the unconfigured device to one or more network hotspot devices through the first hotspot of the one or more network hotspot devices for sending the device information to a server. One or more user terminals corresponding to the one or more network hotspot devices sends a configuration request for the unconfigured device to the server, the server determines that the user terminal of which the configuration request is first received by the server is a target user terminal and sends a configuration response message to the target user terminal, the target user terminal enables the unconfigured device to access the second hotspot of a target network hotspot device corresponding to the target user terminal after receiving the configuration response message. The method can also include accessing, by the unconfigured device, the second hotspot of the target network hotspot device.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 3 illustrates a flow chart of an exemplary method for accessing a network hotspot device by an unconfigured device, consistent with some embodiments of the present disclosure.

FIG. 6 illustrates a flow chart of an exemplary method for accessing a network hotspot device by an unconfigured device, consistent with some embodiments of the present disclosure.

DETAILED DESCRIPTION

Figure 1:
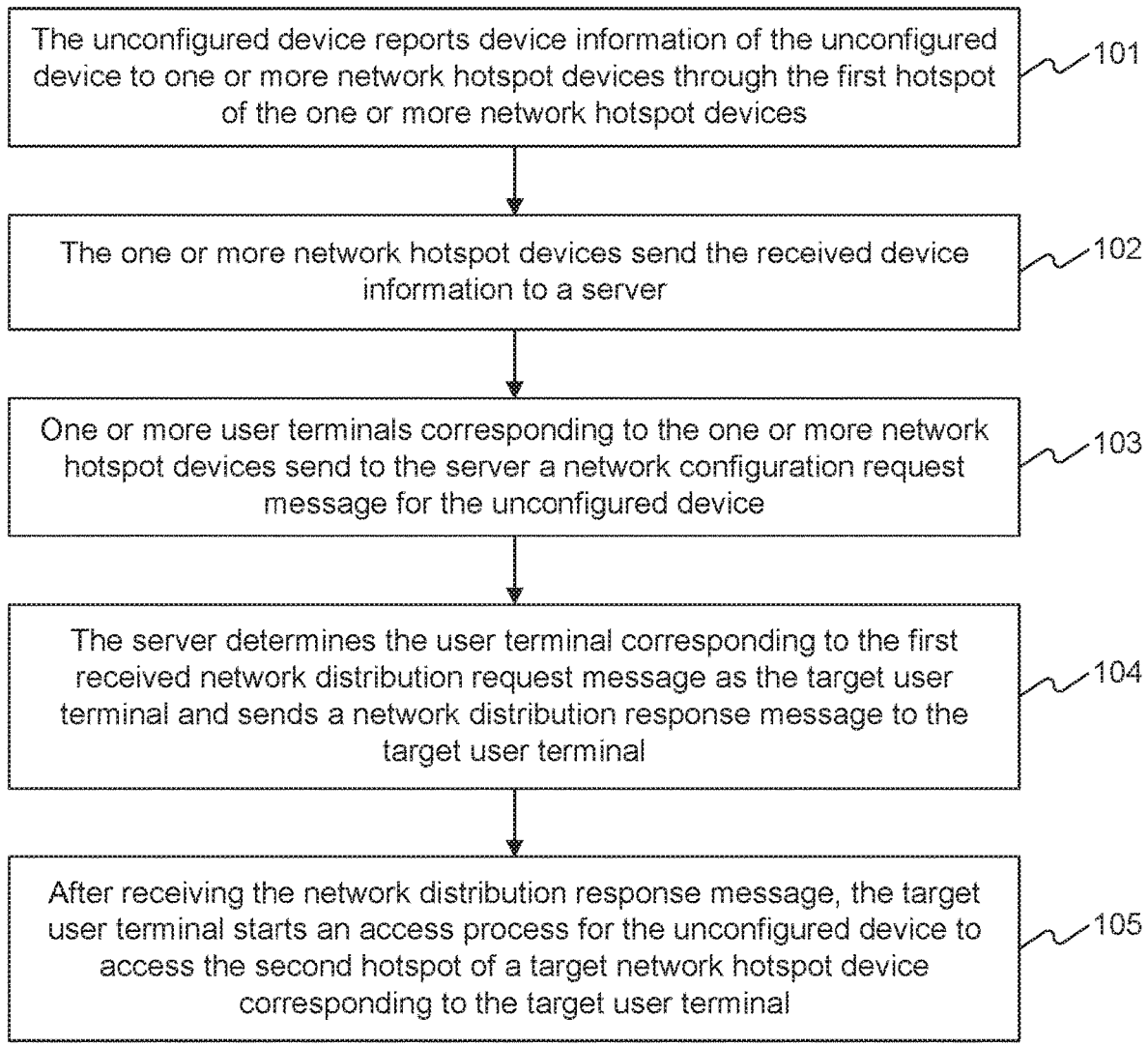
FIG. 1 illustrates a flow chart of an exemplary method for accessing a network hotspot device by an unconfigured device, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

In the Internet of Things scenario, a router is used to provide WIFI hotspots for smart devices. The router can provide hotspots with Internet access and hotspots without Internet access. This kind of hotspot with the ability to access the Internet can be called an online hotspot.

Sending access information of network hotspots to smart devices is network configuration. The access information includes Service Set Identifier (SSID) and password of the hotspot.

In an existing network configuration approach, the Internet hotspot is provided by a router. The user terminal (mobile phone) provides a hotspot for the smart device. The user terminal can place the access information of the Internet hotspot in a specific WiFi data message using a special encoding method and send it to the smart device. The smart device obtains Internet access by monitoring the message Hotspot access information.

The above-mentioned network configuration approach has the following disadvantages.

First, the configuration time is longer. Configuration network packets can only be carried in Wi-Fi management frames. Each packet carries a small amount of access information. In practice, it is often necessary to send dozens of packets to carry the complete access information. Due to the large amount of the Wi-Fi channels, smart devices need to traverse all Wi-Fi channels to monitor the configuration network packets. It often takes about 60 seconds to traverse all Wi-Fi channels.

Second, the user needs to manually enter the access information of the Internet hotspot. In order to ensure the security of the password, the home router often requires the password to be at least 8 bytes long, and requires letters, numbers, and special symbols. Therefore, the process of entering the SSID and password on the mobile phone is cumbersome, time-consuming, and error-prone.

Third, the applicability of the approach is a problem. Currently the family and other router's Wi-Fi often support 2.4 GHz and 5 GHz two bands. When the phone identifies that the router supports dual-band, it will give priority to connecting to the 5 GHz hotspot. Current smart devices mostly support only 2.4 GHz of Wi-Fi. When mobile phones send information about the network configuration in the 5 GHz frequency band, and smart devices cannot monitor relevant data at 2.4 GHz.

Fourth, when multiple users are configuring the network at the same time, mismatching can occur. Assume that user A purchases a device A, and neighbor user B purchases device B of the same model, and user A and user B initiate network configuration at the same time. Since device A and device B can receive configuration network information sent by the two users, it can occur that device A receives the user B configuration network information and is connected to the user B home router's hotspot and that device B is erroneously connected to the user A's home router's hotspots.

In another existing network configuration approach, a smart device starts a Wi-Fi hotspot, a mobile phone connects to the Wi-Fi hotspot of the device, and transmits the SSID and password of the router's Internet hotspot to the smart device, and then connects the smart device to the Internet hotspot and then the Internet.

However, this configuration method has the following disadvantages.

First, the user manually enters the SSID and password of the Internet hotspot. The process of user inputting SSID and password is tedious and error-prone.

Second, after the phone is connected to the device hotspot, the phone usually checks hotspots to determine whether Internet connection is available. If the connection is not available, the phone can switch back to 4G network of the Internet operators of the phone. When the phone switches back before the network configuration is completed, network configuration failure can occur.

Third, configuration mismatch can also occur in this approach when multiple users are configuring the network at the same time. When user A and user B purchase devices of the same model and initiate network configuration at the same time, it can happen that device A is connected to user B's home router hotspot and device B is connected to user A's home router hotspot.

Referring to FIG. 1, a flowchart of an exemplary method for accessing a network hotspot device by an unconfigured device, consistent with some embodiments of the present disclosure. The network hotspot device has a first hotspot and a second hotspot. The method can include the following steps.

In step 101, an unconfigured device reports device information of the unconfigured device to one or more network hotspot devices through the first hotspot of the one or more network hotspot devices. The network hotspot device can be a router or a wireless Access Point (AP) without routing capabilities. The network hotspot devices can create multiple hotspots at the same time, and each hotspot has an SSID for distinguishing from other hotspots.

In some embodiments of the present disclosure, the network hotspot device creates the first hotspot and the second hotspot after power-on. The first hotspot is a hotspot that does not have Internet access capability, and the second hotspot is a hotspot with Internet access capability. If the unconfigured device accesses the first hotspot, the unconfigured device can communicate with the network hotspot device but cannot access the Internet through the network hotspot device. If the unconfigured device accesses the second hotspot, the unconfigured device can communicate with the network hotspot device and can also access the Internet through the network hotspot device.

In some embodiments of the present disclosure, if there are multiple network hotspot devices near the unconfigured device, the unconfigured device can sequentially access the first hotspot of each network hotspot device and report the device information of the unconfigured device. The device information can include a device model and a MAC address.

After accessing the first hotspot of the network hotspot device, the unconfigured device sends the device information to the network hotspot device. Then the unconfigured device disconnects from the network hotspot device, then accesses the first hotspot of the next network hotspot device and sends the device information of the unconfigured device until the device information is sent to all discovered network hotspot devices.

In some embodiments, the unconfigured device can be one or more smart devices in a smart home.

In step 102, the one or more network hotspot devices send the received device information to a server. The server can collect the device information of multiple unconfigured devices and become informed of the presence of the unconfigured device. During this process, the server can find that multiple network hotspot devices have reported the device information of the same unconfigured device.

The network hotspot device can also send its own MAC address to the server. The server can find an IP address of the network hotspot device according to the MAC address of the network hotspot device. so that the server can collect area information where the multiple unconfigured devices are located by determining the area where the unconfigured device is located according to the IP address of the network hotspot device.

In step 103, one or more user terminals corresponding to the one or more network hotspot devices send to the server a network configuration request message for the unconfigured device.

The user terminal corresponding to the network hotspot device refers to the user terminal connected to a hotspot of the network hotspot device. In some embodiments of the present disclosure, the network hotspot device can send a reminder message to the user terminal corresponding to the network hotspot device to inform the user to initiate a network configuration request for the unconfigured device. The user can send the network configuration request message to the server through the user terminal to the server.

In step 104, the server determines the user terminal corresponding to the first received network configuration request message as the target user terminal and sends a network configuration response message to the target user terminal.

If the server receives a network configuration request message sent by multiple user terminals, the server determines the user terminal corresponding to the first received network configuration request message as the target user terminal and sends a network configuration response message to the target user terminal. In order to inform users to start the subsequent network operation. The server can send a request failure message to the user terminals other than the target user terminal to inform other users not to perform the network configuration operation at present, and inform the other users that they can request the network configuration again after a period of time.

In step 105, after receiving the network configuration response message, the target user terminal starts an access process for the unconfigured device to access the second hotspot of a target network hotspot device. The target network hotspot device is corresponding to the target user terminal.

In some embodiments of the present disclosure, after receiving the network configuration response message, the target user terminal can start the access process for the unconfigured device to access the second hotspot of the target network hotspot device automatically or according to the user's operations.

The access process of the configured device to the second hotspot of the target network hotspot device can include: a network configuration process that provides the unconfigured device with access information of the second hotspot of the target network hotspot device. The access information accesses the unconfigured device to the second hotspot of the target network hotspot device, so that the unconfigured device can access the Internet.

In the embodiments of the present disclosure, the unconfigured device can report the device information to the network hotspot device through the first hotspot provided by the network hotspot device. The first hotspot has no Internet access capability. Then the network hotspot device uploads the device information to the server. The server can determine the area where the unconfigured device is located based on the IP address information of the network hotspot device. Therefore, the server can also collect the area and device information of each unconfigured device when the unconfigured device is not networked. Also, equipment supplier can learn in which regions the product is sold better and in which regions it is sold poorly, so as to carry out targeted promotion.

When one or more user terminals simultaneously initiate a network configuration request to the same unconfigured device, the server can only return a response to the first requested target user terminal, and then the target user terminal initiates the network configuration process. This avoids the situation that the device can be incorrectly connected to the wrong network hotspot device when multiple user terminals request network configuration at the same time.

Figure 2:
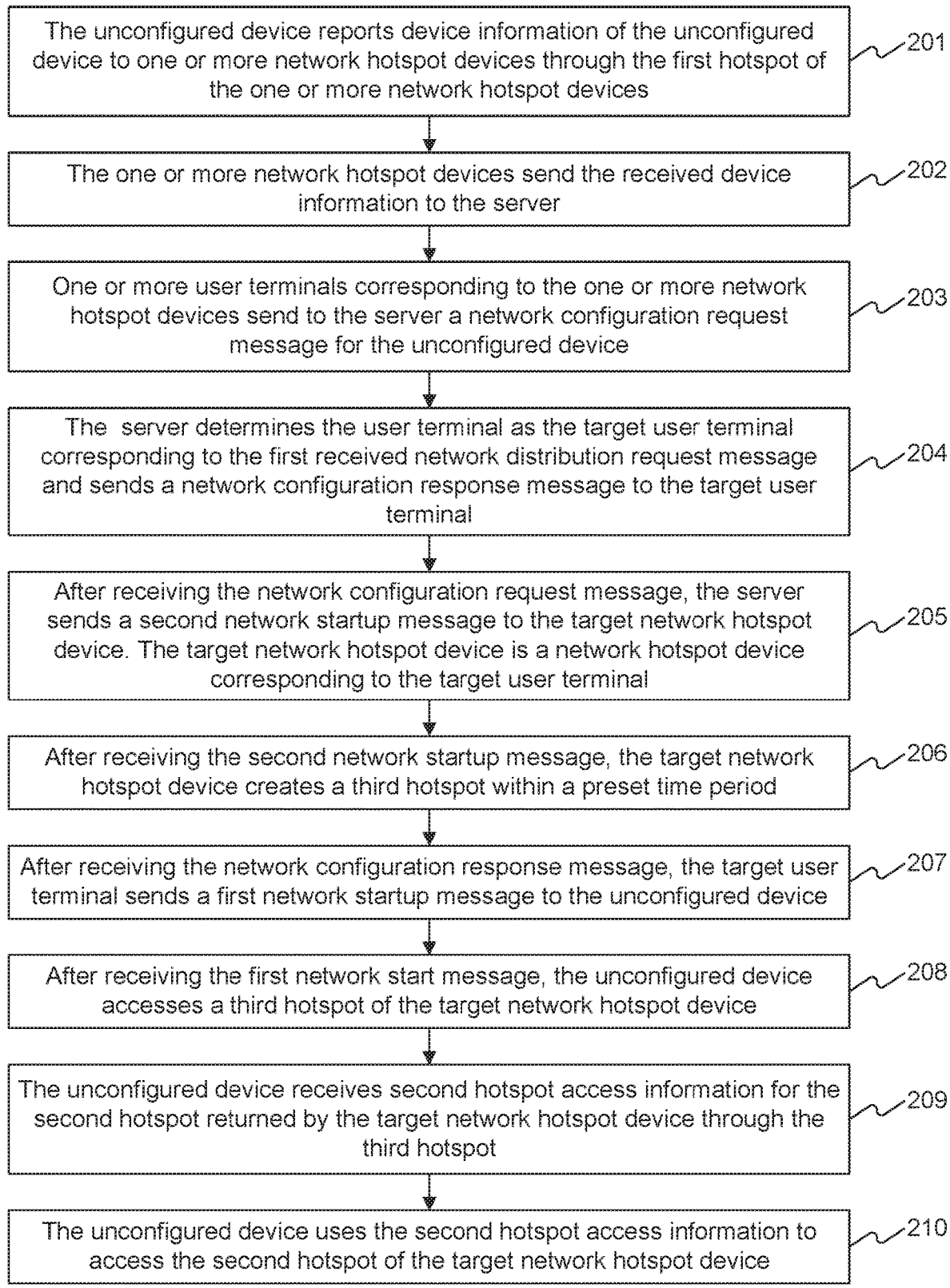
FIG. 2 illustrates a flow chart of an exemplary method for accessing a network hotspot device by an unconfigured device, consistent with some embodiments of the present disclosure.

FIG. 2 illustrates a flow chart of an exemplary method for accessing a network hotspot device by an unconfigured device, consistent with some embodiments of the present disclosure. The network hotspot device can have a first hotspot and a second hotspot. The method can include the following steps.

In step 201, the unconfigured device reports device information of the unconfigured device to one or more network hotspot devices through the first hotspot of the one or more network hotspot devices.

The network hotspot device can be a router or an AP without routing capabilities. In some embodiments of the present disclosure, the network hotspot device can have the first hotspot and the second hotspot after power-on. The first hotspot is a hotspot that does not have Internet access capability, and the second hotspot is a hotspot with Internet access capability. If the unconfigured device accesses the first hotspot, the unconfigured device can communicate with the network hotspot device but cannot access the Internet through the network hotspot device. If the unconfigured device accesses the second hotspot, the unconfigured device can communicate with the network hotspot device and can also access the Internet through the network hotspot device.

Step 201 can include the following sub-steps.

In sub-step S11, the unconfigured device uses preset first hotspot access information for the first hotspot of the one or more network hotspot devices to access the first hotspot of the one or more network hotspot devices one by one.

In some embodiments of the present disclosure, the first hotspot access information (e.g., SSID and password) of the network hotspot device is fixed. The first hotspot access information of multiple network hotspot devices can be preset in the unconfigured device. After the unconfigured device is powered on, the preset first hotspot access information is used to discover the first hotspot. If there are multiple first hotspots, the unconfigured device is connected to the first hotspots of each network hotspot device one by one.

Specifically, the unconfigured device can use the first hotspot access information to generate an access request, and then send the access request to the network hotspot device. The network hotspot device verifies whether the access information is correct. If the access information is correct, the network hotspot device establishes a connection between the unconfigured device and the first hotspot.

In sub-step S12, after accessing the first hotspot of a network hotspot device, the unconfigured device sends the device information to the network hotspot device. After the device information is sent, the connection is disconnected, and then the first hotspot of the next network hotspot device is connected.

In step 202, the one or more network hotspot devices send the device information to the server. The server can collect device information of multiple unconfigured devices and become informed of the presence of the unconfigured device. During this process, the server can find that multiple network hotspot devices have reported the device information of the same unconfigured device.

The network hotspot device can also send its own MAC address to the server. The server can find an IP address of the network hotspot device according to the MAC address of the network hotspot device. so that the server can collect area information where the multiple unconfigured devices are located by determining the area where the unconfigured device is located according to the IP address of the network hotspot device.

In some embodiments, the server acquires the one or more network devices hotspots IP address information. and the server determines the region where the unconfigured device is located based on the IP address information of the one or more network hotspot devices.

The unconfigured device can report the device information to the network hotspot device through the first hotspot provided by the network hotspot device. The first hotspot does not have the ability to access the Internet. The network hotspot device uploads the device information to the server. The server can determine the area where the unconfigured device is located according to the IP address information of the network hotspot device. Therefore, the server can also collect the area and the device information of each unconfigured device when the unconfigured device has not been configured.

Also, equipment supplier can learn in which regions the product is sold better and in which regions it is sold poorly, so as to carry out targeted promotion.

In step 203, one or more user terminals corresponding to the one or more network hotspot devices send to the server a network configuration request message for the unconfigured device.

Step 203 can include the following sub-steps.

In sub-step S21, the one or more user terminals send a query message of the unconfigured device to the corresponding network hotspot device.

The user terminal can send a query message of the unconfigured device to the network hotspot device to which the user terminal is connected to query whether there is a unconfigured device.

In sub-step S22, the one or more network hotspot devices generate notification information of the unconfigured device for the unconfigured device accessing the first hotspot of the network hotspot device according to the query message of the unconfigured device.

After receiving the query message from the unconfigured device, the network hotspot device determines the unconfigured device that has accessed the first hotspot of the network hotspot device. In an example, the first unconfigured device and the second unconfigured device once accessed the first hotspot of a network hotspot device. After sending device information to the network hotspot device, the first unconfigured device and the second unconfigured device disconnect from the network hotspot device. After the network hotspot device receives the query message of the unconfigured device, the network hotspot device generates notification information of the unconfigured device for the first unconfigured device and the second unconfigured device.

The network hotspot device generates notification information of the unconfigured device according to the unconfigured device and returns the notification information of the unconfigured device to the user terminal. The notification information of the unconfigured device can be a list of unconfigured devices.

In sub-step S23, the one or more user terminals receive the notification information of the unconfigured device and generate a network configuration request message for the unconfigured device according to the notification information of the unconfigured device.

The user terminal can select the unconfigured device in the received notification information of the unconfigured device. A network configuration request message is generated for the unconfigured device.

In sub-step S24, the one or more user terminals send the network configuration request message to the server.

In step 204, the server determines the user terminal as the target user terminal corresponding to the first received network configuration request message and sends a network configuration response message to the target user terminal.

If the server receives a network configuration request message sent by multiple user terminals, the server determines the user terminal as the target user terminal corresponding to the first received network configuration request message, and sends a network configuration response message to the target user terminal to inform users to start the subsequent network operation. The server can send a request failure message to user terminals other than the target user terminal to inform other users not to perform the network configuration operation at present and to request the network configuration again after a period of time.

In step 205, after receiving the network configuration request message, the server sends a second network startup message to the target network hotspot device. The target network hotspot device is a network hotspot device corresponding to the target user terminal.

After receiving the network configuration request message sent by the one or more user terminals, the server determines the target user terminal and sends a second network start message to the target network hotspot device connected to the target user terminal to inform the target network hotspot device to create a third hotspot.

When the one or more user terminals simultaneously initiate a network configuration request to the same unconfigured device, the server can return only one response to the first requested target user terminal. The target user terminal initiates the network configuration process. In this way, it can be avoided that the device can be connected to the wrong network hotspot device by mistake when multiple user terminals are configured at the same time.

In step 206, after receiving the second network startup message, the target network hotspot device creates a third hotspot within a preset time period. After a certain period of time, the target network hotspot device can turn off the third hotspot. The third hotspot does not have the ability to access the Internet.

In step 207, after receiving the network configuration response message, the target user terminal sends a first network startup message to the unconfigured device. A remote control device starts the network configuration process.

In one example, after receiving the network configuration response message of the user terminal, the user can start the network configuration process in the unconfigured device. A network configuration start button is set in the unconfigured device. When the start button is pressed, the unconfigured device starts the network configuration process.

In step 208, after receiving the first network start message, the unconfigured device accesses a third hotspot of the target network hotspot device.

After receiving the first configuration network start message, the unconfigured device starts the network configuration process. In the network configuration process, the unconfigured device first accesses the third hotspot of the target network hotspot device.

Step 208 can include the following sub-steps.

In sub-step S31, the unconfigured device uses the preset third hotspot access information for the third hotspot of the target network hotspot device to access the third hotspot of the target network hotspot device.

In some embodiments, the third hotspot access information of the network hotspot device is fixed. The third hotspot access information of multiple network hotspot devices can be preset in the unconfigured device. The network hotspot device can use the preset third hotspot access information to access the third hotspot of the target network hotspot device.

Specifically, the unconfigured device can use the third hotspot access information to generate an access request, and then send the access request to the network hotspot device. The network hotspot device verifies whether the access information is correct. If the access information is correct, network hotspot device establishes a connection between the unconfigured device and the third hotspot.

In step 209, the unconfigured device receives second hotspot access information for the second hotspot returned by the target network hotspot device through the third hotspot.

After the unconfigured device accesses the third hotspot of the target network hotspot device, the network hotspot device returns second hotspot access information for the second hotspot to the unconfigured device.

The second hotspot access information includes an SSID and a password. The SSID is fixed, and the password can be dynamically changed.

In step 210, the unconfigured device uses the second hotspot access information to access the second hotspot of the target network hotspot device.

After receiving the access information of the second hotspot, the unconfigured device disconnects from the third hotspot, then use the second hotspot access information to access the second hotspot of the target network hotspot device. After the network equipment is connected to the second hotspot, the second hotspot can be used to access the Internet.

The unconfigured device use the second hotspot access information to generate an access request, and then send the access request to the network hotspot device. The network hotspot device verifies whether the access information is correct. It the access information is correct, network hotspot device establishes a connection between the device to be configured and the second hotspot.

In some embodiments, the second hotspot access information is returned to the unconfigured device by the network hotspot device, without requiring the user to manually input the access information to the unconfigured device, which simplifies the user's operation and improves the user experience.

FIG. 3 illustrates a flow chart of an exemplary method for accessing a network hotspot device by an unconfigured device, consistent with some embodiments of the present disclosure. The network hotspot device creates a first hotspot and a second hotspot. The method can include the following steps.

In step 301, the unconfigured device accesses the first hotspot of one or more network hotspot devices and sends device information of the unconfigured device to the one or more network hotspot devices. The one or more network hotspot devices are used to send the device information to a server. One or more user terminals corresponding to the one or more network hotspot devices are used to send a network configuration request message for the unconfigured device to the server. The server is used to determine the user terminal as the target user terminal corresponding to the first received network configuration request message and send a network configuration response message to the target user terminal. The target user terminal is used to send the first configuration network start message to the unconfigured device.

In some embodiments, the network hotspot device can be a router or an AP without routing capabilities. In some embodiments of the present disclosure, the network hotspot device can have the first hotspot and the second hotspot after power-on. The first hotspot is a hotspot that does not have Internet access capability, and the second hotspot is a hotspot with Internet access capability.

The unconfigured device can use preset one or more first hotspot access information for one or more network hotspot devices to access the first hotspot of one or more network hotspot devices one by one. After accessing the first hotspot of a network hotspot device, the unconfigured device sends its own device information to the network hotspot device.

In step 302, after receiving the first network start message, the unconfigured device uses the preset third hotspot access information to access the third hotspot of the target network hotspot device. The target network hotspot device is corresponding to the target user terminal.

In some embodiments, after receiving the network configuration request message, the server sends a second network startup message to the target network hotspot device. After receiving the second network startup message, the network hotspot device creates a third hotspot within a preset time period.

The third hotspot access information of the network hotspot device is fixed. The third hotspot access information of multiple network hotspot devices can be preset in the unconfigured device. The network hotspot device can use the preset third hotspot access information to access the third hotspot of the target network hotspot device.

In step 303, the unconfigured device receives second hotspot access information for the second hotspot sent by the target network hotspot device through the third hotspot.

After the unconfigured device accesses the third hotspot of the target network hotspot device, the network hotspot device returns second hotspot access information for the second hotspot to the unconfigured device.

In step 304, the unconfigured device uses the second hotspot access information to access the second hotspot of the target network hotspot device.

After receiving the access information of the second hotspot, the unconfigured device disconnects from the third hotspot, then uses the second hotspot access information to access the second hotspot of the target network hotspot device. After the network equipment is connected to the second hotspot, the second hotspot can be used to access the Internet.

Figure 4:
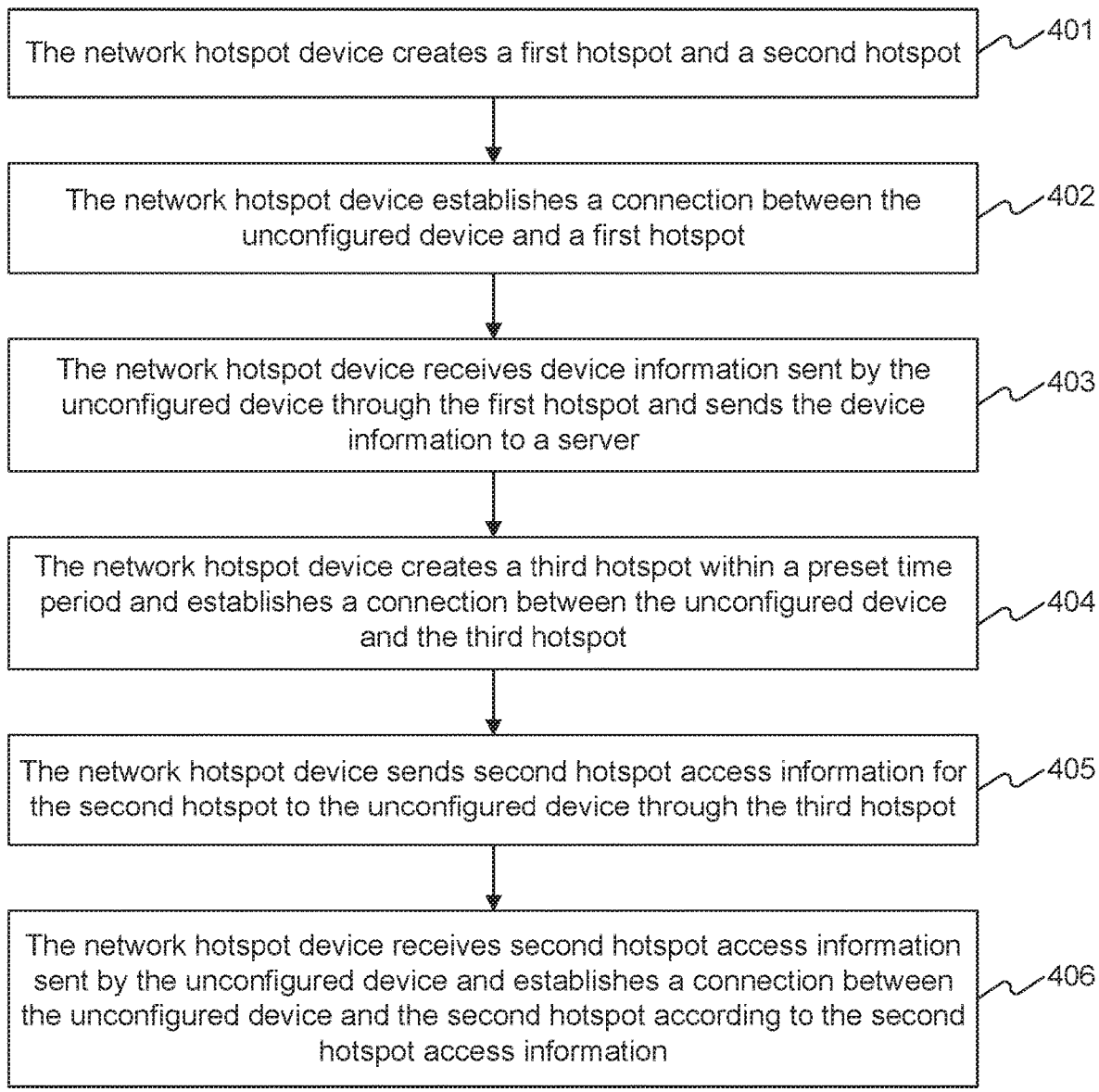
FIG. 4 illustrates a flow chart of an exemplary method for accessing a network hotspot device by an unconfigured device, consistent with some embodiments of the present disclosure.

FIG. 4 illustrates a flow chart of an exemplary method for accessing a network hotspot device by an unconfigured device, consistent with some embodiments of the present disclosure. The method can include the following steps.

In step 401, the network hotspot device creates a first hotspot and a second hotspot.

The network hotspot device can be a router or an AP without routing capabilities. In some embodiments of the present disclosure, the network hotspot device can have the first hotspot and the second hotspot after power-on. The first hotspot is a hotspot that does not have Internet access capability, and the second hotspot is a hotspot with Internet access capability.

In step 402, the network hotspot device establishes a connection between the unconfigured device and a first hotspot.

The first hotspot access information of the network hotspot device can be preset in the unconfigured device. After the unconfigured device is powered on, the preset first hotspot access information is used to discover the first hotspot.

The unconfigured device can use the first hotspot access information to generate an access request, and then send the access request to the network hotspot device. The network hotspot device verifies whether the access information is correct. If the access information is correct, network hotspot device establishes a connection between the unconfigured device and the first hotspot.

In step 403, the network hotspot device receives device information sent by the unconfigured device through the first hotspot and sends the device information to a server.

After accessing the first hotspot of a network hotspot device, the unconfigured device sends its own device information to the network hotspot device and disconnects the connection after sending the device information. The network hotspot device sends the received device information to the server, so that the server can collect device information of multiple unconfigured devices and can become informed that there is currently a new unconfigured device.

The network hotspot device can also send its own MAC address to the server. The server can find the IP address of the network hotspot device according to the MAC address of the network hotspot device. According to the IP address of the network hotspot device, the area where the unconfigured device is located is determined so that the server can collect the area information of multiple unconfigured devices.

In step 404, the network hotspot device creates a third hotspot within a preset time period and establishes a connection between the unconfigured device and the third hotspot.

In some embodiments, the user terminal connected to the network hotspot device can send a query message of the unconfigured device to the network hotspot device to query whether there is an unconfigured device.

After the network hotspot device receives the query message of the unconfigured device, the network hotspot device determines that a device that has been connected to the first hotspot of the network hotspot device is the unconfigured device. The network hotspot device generates the notification information of the unconfigured device and returns the notification information of the unconfigured device to the user terminal.

The user terminal can select the unconfigured device in the received notification information of the unconfigured device. The user terminal generates a network configuration request message for the unconfigured device that requires network configuration, and then sends the network configuration request message to the server.

After receiving the network configuration request message, the server returns a network configuration response message to the user terminal. At the same time, the server also sends a second network configuration request message to the network hotspot device. After receiving the second network configuration request message, the network hotspot device creates a third hotspot within a preset time period.

After receiving the network configuration response message, the user terminal sends a first network configuration start message to the unconfigured device. After receiving the first network configuration request message, the unconfigured device uses the preset third hotspot access information to request access to the third hotspot of the network hotspot device. The network hotspot device establishes a connection between the unconfigured device and the third hotspot according to the third hotspot access information sent by the unconfigured device.

In step 405, the network hotspot device sends second hotspot access information for the second hotspot to the unconfigured device through the third hotspot.

The network hotspot device returns the second hotspot access information for the second hotspot to the unconfigured device.

In step 406, the network hotspot device receives second hotspot access information sent by the unconfigured device and establishes a connection between the unconfigured device and the second hotspot according to the second hotspot access information.

The unconfigured device uses the received second hotspot access information to request access to the second hotspot of the network hotspot device. The network hotspot device establishes a connection between the unconfigured device and the second hotspot according to the second hotspot access information sent by the unconfigured device.

Figure 5:
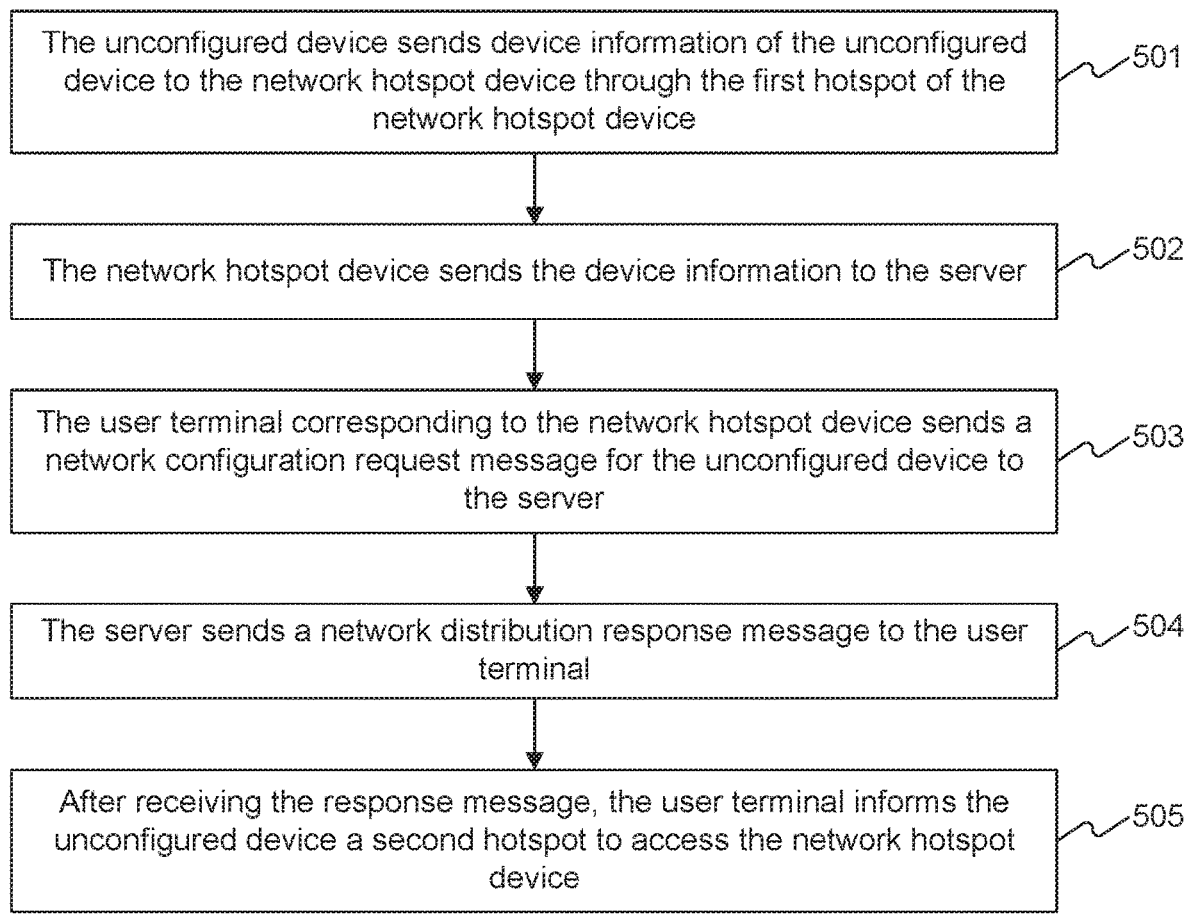
FIG. 5 illustrates a flow chart of an exemplary method for accessing a network hotspot device by an unconfigured device, consistent with some embodiments of the present disclosure.

FIG. 5 illustrates a flow chart of an exemplary method for accessing a network hotspot device by an unconfigured device, consistent with some embodiments of the present disclosure. The network hotspot device has a first hotspot and a second hotspot. The method can include the following steps.

In step 501, the unconfigured device sends device information of the unconfigured device to the network hotspot device through the first hotspot of the network hotspot device.

The network hotspot device can be a router or an AP without routing capabilities. In some embodiments of the present disclosure, the network hotspot device can have the first hotspot and the second hotspot after power-on. The first hotspot is a hotspot that does not have Internet access capability, and the second hotspot is a hotspot with Internet access capability.

Step 501 can include the following sub-steps.

In sub-step S41, the unconfigured device uses the preset first hotspot access information for the first hotspot of the network hotspot device to access the first hotspot of the network hotspot device.

In sub-step S42, after accessing the first hotspot of the network hotspot device, the unconfigured device sends its own device information to the network hotspot device.

In step 502, the network hotspot device sends the device information to the server.

In step 503, the user terminal corresponding to the network hotspot device sends a network configuration request message for the unconfigured device to the server.

Step 503 can include the following sub-steps.

In sub-step S51, the user terminal sends a query message of the unconfigured device to the corresponding network hotspot device.

In sub-step S52, the network hotspot device generates, according to the query message of the unconfigured device, a notification message of the unconfigured device that accesses the first hotspot of the network hotspot device.

In sub-step S53, the user terminal receives the notification information of the unconfigured device and generates a network configuration request message for the unconfigured device according to the notification information of the unconfigured device.

In sub-step S54, the user terminal sends the network configuration request message to the server.

In step 504, the server sends a network configuration response message to the user terminal.

In step 505, after receiving the response message, the user terminal informs the unconfigured device a second hotspot to access the network hotspot device.

Step 505 can include the following sub-steps.

In sub-step S61, after receiving the network configuration response message, the user terminal sends a first network startup message to the unconfigured device.

In sub-step S62, after receiving the first configuration network start message, the unconfigured device accesses a third hotspot of the network hotspot device.

In some embodiments, the third hotspot does not have Internet access capability.

Sub-step S62 can further include that the unconfigured device uses preset third hotspot access information for the third hotspot of the network hotspot device to access the third hotspot of the network hotspot device.

In sub-step S63, the unconfigured device receives second hotspot access information for the second hotspot returned by the network hotspot device through the third hotspot.

In sub-step S64, the unconfigured device uses the second hotspot access information to access the second hotspot of the network hotspot device.

In some embodiments, after receiving the network configuration request message, the server sends a second network startup message to the network hotspot device. After receiving the second network start message, the network hotspot device creates a third hotspot within a preset time period.

In some embodiments, the server obtains the IP address information of the network hotspot device. The server determines the area where the unconfigured device is located based on the IP address information of the network hotspot device.

In the embodiments of the present disclosure, the unconfigured device can report the device information to the network hotspot device through the first hotspot provided by the network hotspot device. The first hotspot has no Internet access capability. Then the network hotspot device uploads the device information to the server. The server can determine the area where the unconfigured device is located based on the IP address information of the network hotspot device. Therefore, the server can also collect the area and device information of each unconfigured device when the unconfigured device is not networked. Also, equipment supplier can learn in which regions the product is sold better and in which regions it is sold poorly, so as to carry out targeted promotion.

When one or more user terminals simultaneously initiate a network configuration request to the same unconfigured device, the server can only return a response to the first requested target user terminal, and then the target user terminal initiates the network configuration process. This avoids the situation that the device can be incorrectly connected to the wrong network hotspot device when multiple user terminals request network configuration at the same time.

FIG. 6 illustrates a flow chart of an exemplary method for accessing a network hotspot device by an unconfigured device, consistent with some embodiments of the present disclosure. The network hotspot device has a first hotspot and a second hotspot. The method can have the following steps.

In step 601, the unconfigured device accesses the first hotspot of the network hotspot device and sends device information of the unconfigured device to the network hotspot device. The network hotspot device is used to send the device information to the server. The user terminal corresponding to the network hotspot device is used to send a network configuration request message to the server for the unconfigured device. The server is used to send a network configuration response message to the user terminal. The user terminal is used to send a first configuration network start message to the unconfigured device.

The network hotspot device can be a router or an AP without routing capabilities. In some embodiments of the present disclosure, the network hotspot device can have the first hotspot and the second hotspot after power-on. The first hotspot is a hotspot that does not have Internet access capability, and the second hotspot is a hotspot with Internet access capability.

In step 602, after receiving the first configuration network start message, the unconfigured device uses the preset third hotspot access information to access the third hotspot of the network hotspot device.

In some embodiments, after receiving the network configuration request message, the server sends a second network startup message to the target network hotspot device. After receiving the second network startup message, the network hotspot device creates a third hotspot during a preset time period.

The third hotspot access information of the network hotspot device is fixed. The third hotspot access information of multiple network hotspot devices can be preset in the unconfigured device. The network hotspot device can use the preset third hotspot access information to access the third hotspot of the target network hotspot device.

In step 603, the unconfigured device receives second hotspot access information for the second hotspot sent by the network hotspot device through the third hotspot.

After the unconfigured device accesses the third hotspot of the target network hotspot device, the network hotspot device returns second hotspot access information for the second hotspot to the unconfigured device.

In step 604, the unconfigured device uses the second hotspot access information to access the second hotspot of the network hotspot device.

After receiving the access information of the second hotspot, the unconfigured device disconnects from the third hotspot, then uses the second hotspot access information to access the second hotspot of the target network hotspot device. After the network equipment is connected to the second hotspot, the second hotspot can be used to access the Internet.

Figure 7:
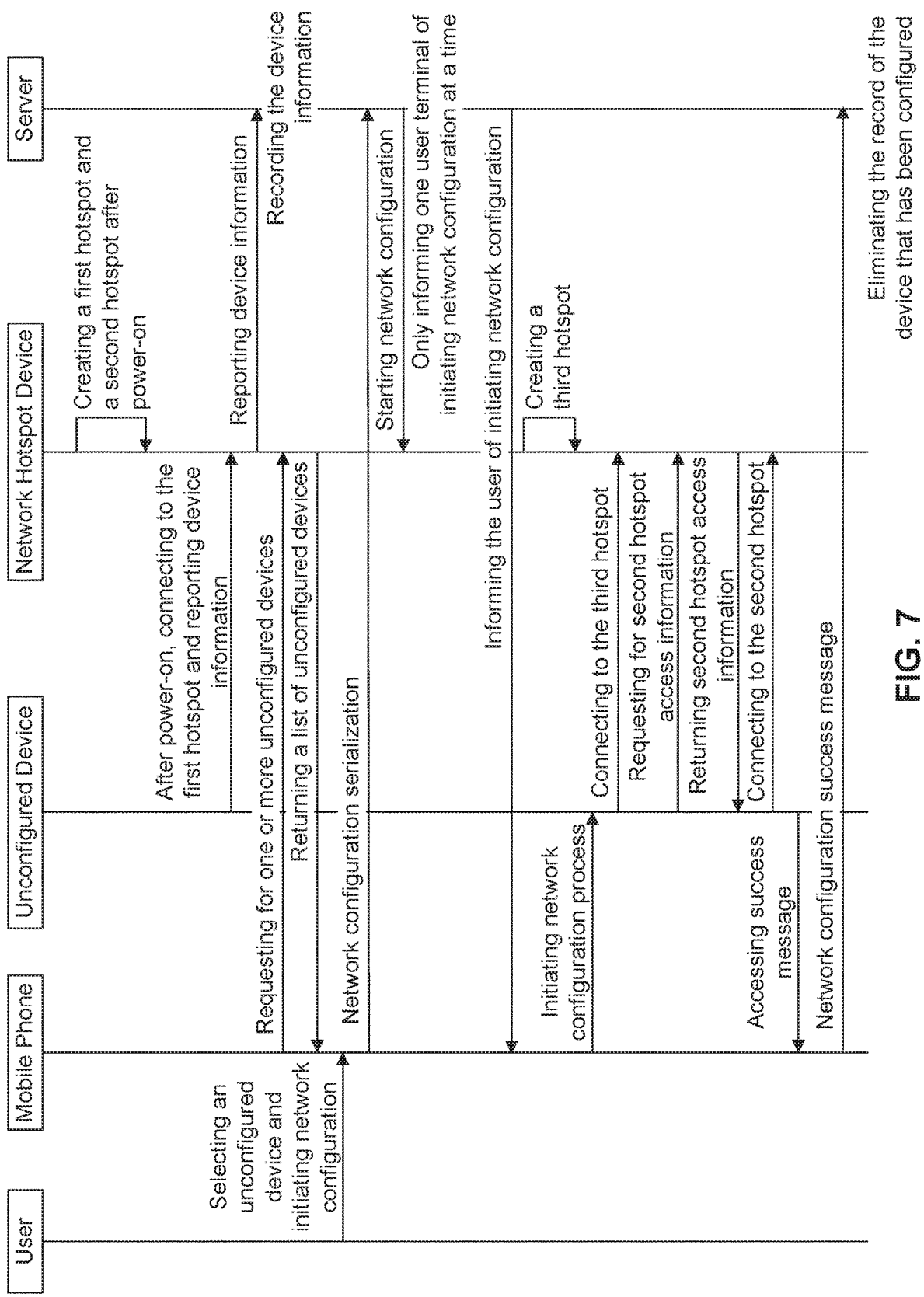
FIG. 7 illustrates a flow chart of an exemplary method for accessing a network hotspot device by an unconfigured device, consistent with some embodiments of the present disclosure.

FIG. 7 illustrates a flow chart of an exemplary method for accessing a network hotspot device by an unconfigured device, consistent with some embodiments of the present disclosure.

The network hotspot device can be a router or an AP without routing capabilities. In some embodiments of the present disclosure, the network hotspot device can create a first hotspot and a second hotspot after power-on. The first hotspot is a hotspot that does not have Internet access capability, and the second hotspot is a hotspot with Internet access capability. An SSID and a password of the first hot spot are fixed.

A firmware of the unconfigured device presets the SSID and the password of the first hotspot. The unconfigured device is connected to the first hotspot of the network hotspot device using the SSID and the password after power-on. If the unconfigured device discovers multiple first hotspots, the unconfigured device connects to each first hotspot one by one. The unconfigured device notifies device model and MAC address information of the unconfigured device to the network hotspot device where one first hotspot is located. Then the unconfigured device disconnects to the above-mentioned first hotspot and connects to the next first hotspot until all supported network hotspot devices are aware of the existence of the unconfigured device.

After the network hotspot devices learn the device information of the unconfigured device, the network hotspot devices report models, MAC addresses, router identifiers (e.g., router MAC addresses) to the server such that the server is informed about the existence of the unconfigured device. The server records the device information of the unconfigured device. It is likely that the server discovers that multiple network hotspot devices report discovery of the same unconfigured device.

When a user opens a mobile App, the App can inquire the network hotspot device with which the App is connected whether an unconfigured device exists. The network hotspot device can return a list of unconfigured devices with which the network hotspot device is connected to the mobile App.

After the user receives the list of unconfigured devices, the user can select initiating network configuration for an unconfigured device. Then a network configuration serialization process is initiated. Each time only one user terminal is informed of initiating configuration. Network configuration of multiple unconfigured devices are performed one after another.

In an example, user 1 and user 2 who is the neighbor of user 1 both have bought devices of the same model (e.g., user 1 having device 1 and user 2 having device 2). After both device 1 and device 2 are powered on, both device 1 and device 2 can report the model and MAC information to network hotspot devices of user 1 and user 2. The Apps of both user 1 and user 2 can display two unconfigured devices. It can occur that user 1 or user 2 randomly selects one unconfigured device of the two unconfigured devices since the users probably do not know which one is their own device. It is likely that user 1 initiates network configuration for device 2 while user 2 initiates network configuration for device 1, then device 1 is connected to the network hotspot device of user 2 while device 2 is connected to the network hotspot device of user 1.

To initiate network configuration, user 1 sends a network configuration request message to the server from the mobile phone of user 1. The network configuration request message is used to send the information of all the devices of the same model found by the network hotspot device of user 1 no matter which device user 1 has chosen to the server and inform the server that no network configuration request is allowed from other users for these devices.

When user 2 initiates network configuration of a device, user 2's mobile App request arrives at the server. The server determines that the device is currently being processed by another user for network configuration, immediately returns a configuration network failure message to user 2, and informs the 2 to wait for a period of time (e.g., 60 seconds) and try the network configuration again.

Referring back to FIG. 7, the server then sends a second configuration network start message to the first network hotspot device connected to the user who initiated the network configuration to inform the network hotspot device to start the network configuration. The hotspot device that receives a second network configuration start message creates a third hotspot (the SSID and the password are fixed). The third hotspot can last for a period of time (e.g., 60 seconds) before closing.

The server can also send a network configuration response message to the mobile phone of the user who started the network configuration, and then the mobile phone App can prompt the user to initiate the network configuration process on the device. In one example, the device can have a button to start the network configuration taking place in the device. The user can press the network configuration device button to start the network configuration. In another example, the mobile phone can send a first network configuration start message to the device. After receiving the first network configuration start message, the device starts the network configuration process.

When the network configuration starts, the unconfigured device connects to the preset third hotspot of the network hotspot device using the SSID and the password of the preset third hotspot.

The network hotspot device determines that the model of the device requesting network configuration is the unconfigured device that the network hotspot device wishes to configure and sends the SSID and the password of the second hotspot to the unconfigured device.

After the unconfigured device receives the SSID and the password of the second hotspot, the unconfigured device connects to the second hotspot of the network hotspot device.

After the unconfigured device is connected to the second hotspot, unconfigured device can notify the mobile phone APP that the unconfigured device has connected to the second hotspot.

The mobile APP can notify the server that the network configuration is successful.

After the server knows that the unconfigured device is successfully configured, the server clears the record of the device that has been configured.

In some embodiments, the unconfigured device can report the device information to the network hotspot device through the first hotspot (without the ability to access the Internet) provided by the network hotspot device. The network hotspot device uploads the device information to the server. The server can determine the area where the unconfigured device is located according to the IP address information of the network hotspot device. Therefore, the server can collect the area and device information of each unconfigured device when the unconfigured device is not equipped with a network. Equipment suppliers can learn in which regions the product such as the device that is to be configured is sold better and in which regions the product is sold poorly, so as to carry out targeted promotion.

When one or more user terminals initiate a network configuration request to the same unconfigured device at the same time, the server only returns a response to the target user terminal of the first request, and the target user terminal initiates the network configuration process. This avoids the situation that the device is incorrectly connected to the wrong network hotspot device when multiple user terminals configure the network at the same time.

In some embodiments, the second hotspot access information is returned by the network hotspot device to the unconfigured device, without the user manually inputting the access information to the unconfigured device, which simplifies user operations and improves user experience.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Figure 8:
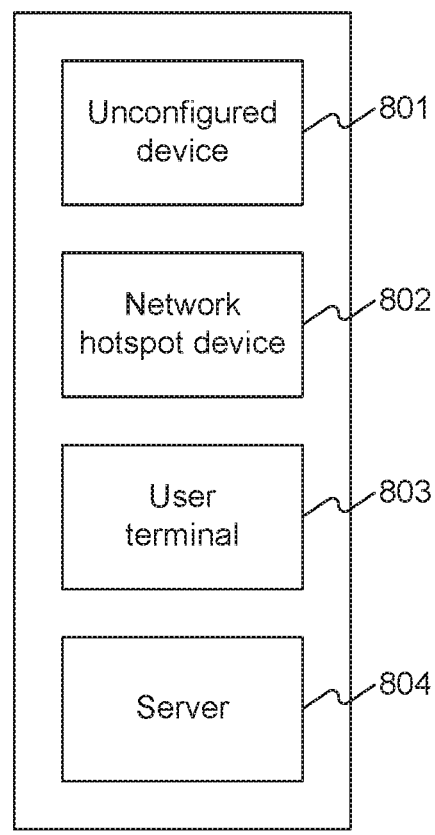
FIG. 8 illustrates a schematic diagram of an exemplary system for accessing a network hotspot by an unconfigured device, consistent with some embodiments of the present disclosure.

FIG. 8 illustrates a schematic diagram of an exemplary system for accessing a network hotspot by an unconfigured device, consistent with some embodiments of the present disclosure. The system can include an unconfigured device 801, a network hotspot device 802, a user terminal 803 corresponding to network hotspot device 802, and a server 804.

Network hotspot device 802 is configured to create a first hotspot and a second hotspot.

Unconfigured device 801 is configured to report device information of the unconfigured device 801 to network hotspot device 802 via the first hotspot of network hotspot device 802.

Network hotspot device 802 is also configured to send the device information of unconfigured device 801 to server 804.

User terminal 803 corresponding to network hotspot device 802 is configured to send a network configuration request message for unconfigured device 801 to server 804.

Server 804 is configured to determine the user terminal corresponding to the first received network configuration request message as a target user terminal and send a network configuration response message to the target user terminal.

The target user terminal in user terminal 803 is configured to start the access process of the second hotspot of the target network hotspot device by unconfigured device 801 after receiving the network configuration response message. The target network hotspot device is a network hotspot device corresponding to the target user terminal.

In some embodiments, unconfigured device 801 is further configured to use preset first hotspot access information for network hotspot devices 802 to access the first hotspots of the network hotspot devices 802 one by one. After accessing the first hotspot of hotspot network device 802, unconfigured device 801 sends its device information to network hotspot device 802.

In some embodiments, user terminal 803 is also configured to send a query message of the unconfigured device to corresponding network hotspot device 802.

Network hotspot device 802 is further configured to generate, according to the query message of the unconfigured device, a notification message of unconfigured device 801 corresponding to the first hotspot of the network hotspot device 802.

User terminal 803 is further configured to receive the notification information of the unconfigured device and generate a network configuration request message for unconfigured device 801 according to the notification information of the unconfigured device. The message is sent to the server 804.

In some embodiments, the target user terminal is further configured to send a first network start message to unconfigured device 801 after receiving the network configuration response message.

Unconfigured device 801 is further configured to access a third hotspot of the target network hotspot device after receiving the first network start message, receive the second hotspot access information for the second hotspot via the third hotspot of the target network hotspot device, and utilize the second hotspot access information to access the second hotspot of the target network hotspot device.

Server 804 is further configured to send a second network start message to the target network hotspot device after receiving the network request message.

The target network hotspot device in the network hotspot device 802 is used to create a third hotspot within a preset time period after receiving the second network start message.

Unconfigured device 801 is further configured to use preset third hotspot access information for the third hotspot of the target network hotspot device to access the third hotspot of the target hotspot device.

Server 804 is further configured to send a network configuration failure message to user terminals other than the target user terminal.

Server 804 is further configured to obtain IP address information of the hotspot network device 802 and determine a region where unconfigured device 801 is located according to the IP address information of the hotspot network device.

In some embodiments, the first hotspot does not have Internet access capability, and the second hotspot has Internet access capability.

Figure 9:
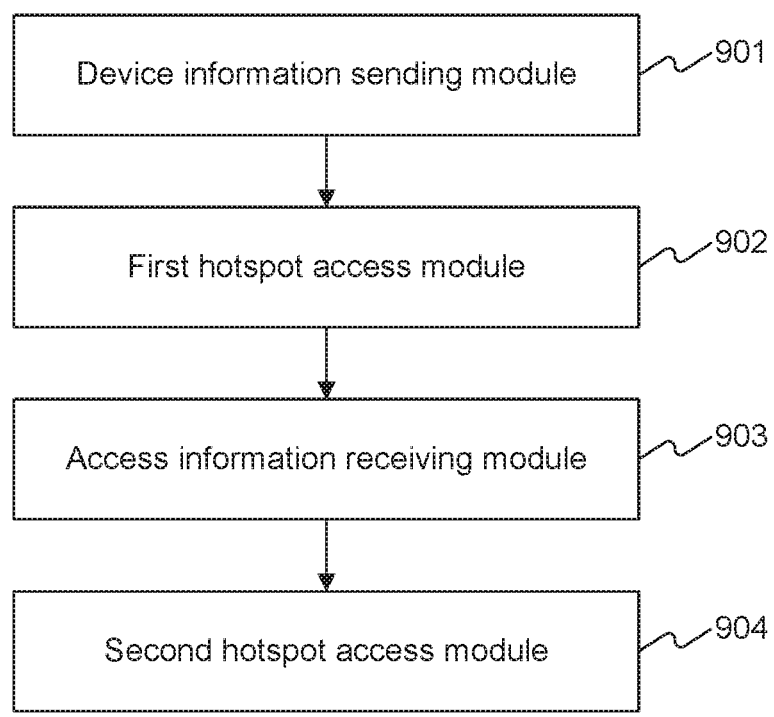
FIG. 9 illustrates a schematic diagram of an exemplary apparatus for accessing a network hotspot by an unconfigured device, consistent with some embodiments of the present disclosure.

FIG. 9 illustrates a schematic diagram of an exemplary apparatus for accessing a network hotspot by an unconfigured device, consistent with some embodiments of the present disclosure. The hotspot network device can have a first and a second hot hotspot. The apparatus can be an unconfigured device. The apparatus can include a device information sending module 901, a first hotspot access module 902, an access information receiving module 903, and a second hotspot access module 904.

Device information sending module 901 is configured to access a first hotspot of one or more network hotspot devices, sends device information of device information sending module 901 to the one or more network hotspot devices. The one or more network hotspot devices are configured to send the device information to a server. One or more user terminals corresponding to the one or more network hotspot devices are used to initiate a network configuration request message to the server for the unconfigured device. The server is used to determine the user terminal corresponding to the first received network configuration request message as the target user terminal and send the network configuration response message to the target user terminal. The target user terminal is used to send a first configuration network start message to the unconfigured device.

First hotspot access module 902 is configured to use preset third hotspot access information to access the third hotspot of the target network hotspot device after receiving the first configuration network start message. The target network hotspot device is corresponding to the target user terminal.

Access information receiving module 903 is configured to receive second hotspot access information for the second hotspot sent by the third hotspot of the target network hotspot device.

Second hotspot access module 904 is configured to use the second hotspot access information to access the second hotspot of the target network hotspot device.

Figure 10:
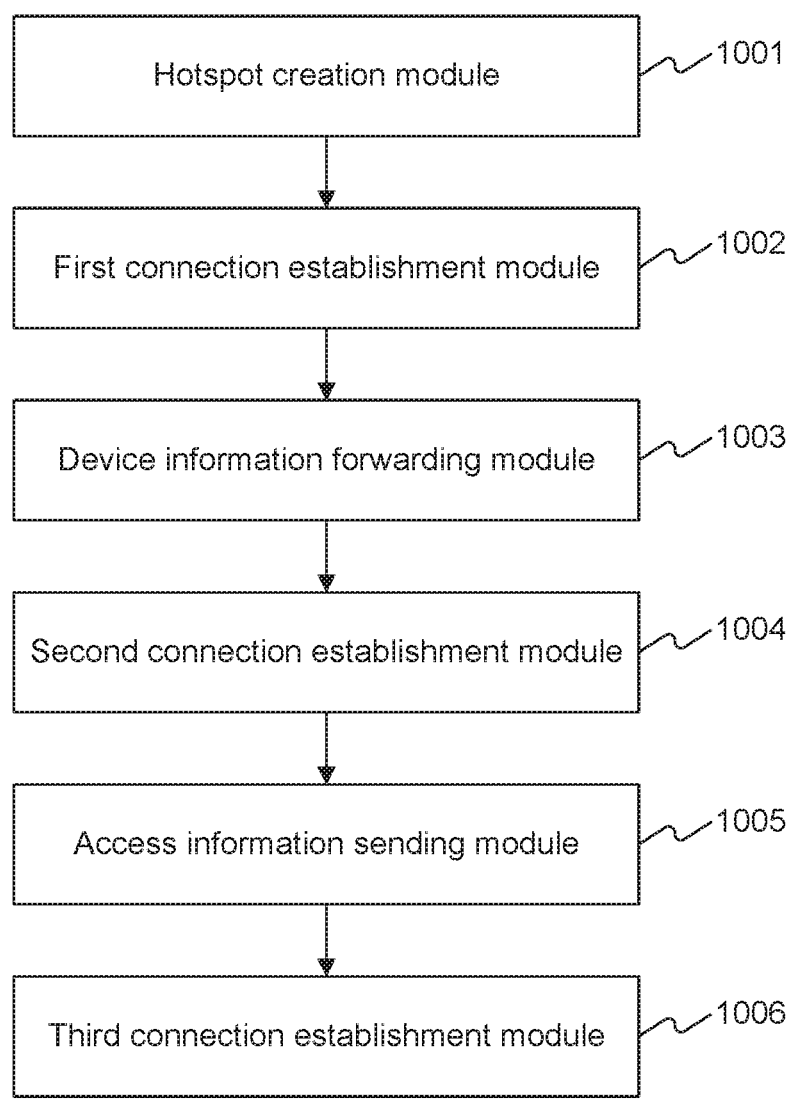
FIG. 10 illustrates a schematic diagram of an exemplary apparatus for accessing a network hotspot by an unconfigured device, consistent with some embodiments of the present disclosure.

FIG. 10 illustrates a schematic diagram of an exemplary apparatus for accessing a network hotspot by an unconfigured device, consistent with some embodiments of the present disclosure. The apparatus can be a network hotspot device. The apparatus can include a hotspot creation module 1001, a first connection establishment module 1002, a device information forwarding module 1003, a second connection establishment module 1004, an access information sending module 1005, and a third connection establishment module 1006.

Hotspot creation module 1001 is configured to create a first hotspot and a second hotspot.

First connection establishment module 1002 is configured to establish a connection between the unconfigured device and the first hotspot.

Device information forwarding module 1003 is configured to receive device information sent by the unconfigured device through the first hotspot and send the device information to a server.

Second connection establishment module 1004 is configured to create a third hotspot within a preset time period and to establish a connection between the unconfigured device and the third hotspot.

Access information sending module 1005 is configured to send second hotspot access information for the second hotspot to the unconfigured device through the third hotspot.

Third connection establishment module 1006 is configured to receive second hotspot access information sent by the unconfigured device and establish a connection between the unconfigured device and the second hotspot according to the second hotspot access information.

Embodiments of the present disclosure also provide a system for accessing a network hotspot by an unconfigured device. The system can include a unconfigured device, a network hotspot device, a user terminal corresponding to the network hotspot device and a server. The network hotspot is configured to create a first hotspot and a second hotspot, the unconfigured device is configured to send device information of the unconfigured device to the network hotspot device through the first hotspot of the network hotspot device, the network hotspot device is configured to send the device information to the server, the user terminal is configured to send a configuration request for the unconfigured device to the server, the server is configured to send a configuration response message to the user terminal, and the user terminal is further configured to enable the unconfigured device to access the second hotspot of the network hotspot device after receiving the configuration response message.

In some embodiments, the unconfigured device is further used to access the first hotspot of the network hotspot device by using preset first hotspot access information for the first hotspot of the network hotspot device, send its own device information to the network hotspot device after accessing the first hotspot of the network hotspot device.

In some embodiments, the user terminal is also used to send a query message of the unconfigured device to the corresponding network hotspot device.

The network hotspot device is also used to generate an unconfigured device notification message for the unconfigured device for accessing the first hotspot of the network hotspot device based on an unconfigured device query message.

The user terminal is further configured to receive the unconfigured device notification message and generate a configuration request for the unconfigured device based on the unconfigured device notification message and send the configuration request to the server.

In some embodiments, the user terminal is further configured to, after receiving a network configuration response message, send a first network startup message to the device to the unconfigured device.

In some embodiments, the unconfigure device is configured to access the third hotspot of the network hotspot device using third hotspot access information of the third hotspot of the network hotspot device.

In some embodiments, the server sends a second network configuration startup message to the network hotspot device after receiving the configuration request, and the network hotspot device generates a third hotspot within a period of time after receiving the second network configuration startup message.

In some embodiments, the first hotspot is a hotspot that does not have Internet access capability, and the second hotspot is a hotspot with Internet access capability.

In some embodiments, the unconfigure device is configured to access the third hotspot of the network hotspot device using third hotspot access information of the third hotspot of the network hotspot device.

In some embodiments, the server obtains IP address information of the network hotspot device and determines a region where the unconfigured device is located.

Embodiments of the present disclosure provide an apparatus for accessing a network hotspot device by an unconfigured device. The hotspot network device can have a first and a second hot hotspot. The apparatus can be an unconfigured device. The apparatus can include a device information sending module, a first hotspot access module, an access information receiving module, and a second hotspot access module.

The device information sending module is configured to access a first hotspot of one or more network hotspot devices, sends device information of device information sending module 901 to the one or more network hotspot devices. The one or more network hotspot devices are configured to send the device information to a server. One or more user terminals corresponding to the one or more network hotspot devices are used to initiate a network configuration request message to the server for the unconfigured device. The server is used to determine the user terminal corresponding to the first received network configuration request message as the target user terminal and to send the network configuration response message to the target user terminal. The target user terminal is used to send a first configuration network start message to the unconfigured device.

The first hotspot access module is configured to use preset third hotspot access information to access the third hotspot of the target network hotspot device after receiving the first configuration network start message. The target network hotspot device is corresponding to the target user terminal.

The access information receiving module is configured to receive second hotspot access information for the second hotspot sent by the third hotspot of the target network hotspot device.

The second hotspot access module is configured to use the second hotspot access information to access the second hotspot of the target network hotspot device.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Embodiments of the present disclosure also provide a device for accessing a network hotspot device by an unconfigured device. The device can include a memory storing a set of instructions and one or more processors configured to execute the set of instructions to cause the apparatus to perform the above-mentioned methods.

Embodiments of the present disclosure also provide a non-transitory computer readable medium that stores a set of instructions that is executable by at least one processor of a computer to cause the computer to perform the above-mentioned methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for accessing a network hotspot device by an unconfigured device, wherein the network hotspot device is configured to create a first hotspot and a second hotspot in one or more network hotspot devices, comprising:
   reporting, by the unconfigured device, device information of the unconfigured device to the one or more network hotspot devices through the first hotspot of the one or more network hotspot devices for sending the device information to a server, wherein one or more user terminals corresponding to the one or more network hotspot devices are configured to send a configuration request for the unconfigured device to the server, the server is configured to determine that one of the one or more user terminals of which the configuration request is first received by the server is a target user terminal and to send a configuration response message to the target user terminal, the target user terminal is configured to enable the unconfigured device to access the second hotspot of the one or more network hotspot devices corresponding to the target user terminal after receiving the configuration response message; and
   accessing, by the unconfigured device, the second hotspot of the one or more network hotspot devices.

2. The method of claim 1, wherein the reporting, by the unconfigured device, the device information of the unconfigured device to the one or more network hotspot devices through the first hotspot of the one or more network hotspot devices for sending the device information to the server comprises:
   accessing the first hotspot of each network hotspot device one by one using first hotspot access information of the first hotspot of each network hotspot device; and
   sending the device information of the unconfigured device to each network hotspot device through the first hotspot of each network hotspot device.

3. The method of claim 1, wherein accessing, by the unconfigured device, the second hotspot of the target network hotspot device, comprises:
   after receiving a first network configuration startup message sent by the target user terminal, accessing a third hotspot of the target network hotspot device;
   receiving second hotspot access information of a second hotspot sent by the third hotspot of the target network hotspot device; and
   accessing the second hotspot of the target network hotspot device using the second hotspot access information.

4. The method of claim 3, wherein after receiving the first network configuration start message sent by the target user terminal, accessing the third hotspot of the target network hotspot device comprises:
   accessing the third hotspot of the target network hotspot device using third hotspot access information of the third hotspot of the target network hotspot device.

5. The method of claim 3, wherein
   the server is configured to send a second network configuration startup message to the target network hotspot device after receiving the configuration request, and the target network hotspot device generates a third hotspot within a period of time after receiving the second network configuration startup message.

6. The method of claim 1, wherein
the one or more user terminals are configured to send an unconfigured device query message to the corresponding network hotspot device,
the one or more network hotspot devices are configured to generate an unconfigured device notification message for the unconfigured device for accessing the first hotspot of the one or more network hotspot devices based on an unconfigured device query message, and
the one or more user terminals are configured to receive the unconfigured device notification message and to generate the configuration request for the unconfigured device based on the unconfigured device notification message for sending the configuration request to the server.

7. The method of claim 1, wherein
the server is configured to send a network configuration failure message to the remaining user terminals other than the target user terminal among the one or more user terminals.

8. The method of claim 1, wherein
the server is configured to obtain an internet protocol (IP) address information of the one or more network hotspot devices and to determine a region where the unconfigured device is located.

9. The method of claim 1, wherein the second hotspot is capable of accessing Internet.

10. An apparatus for accessing a network hotspot device, comprising:
a memory storing a set of instructions; and one or more processors configured to execute the set of instructions to cause the apparatus to perform:
reporting device information of an unconfigured device to one or more network hotspot devices through a first hotspot of the one or more network hotspot devices for sending the device information to a server, wherein one or more user terminals corresponding to the one or more network hotspot devices are configured to send a configuration request for the unconfigured device to the server, the server is configured to determine that one of the one or more user terminals of which the configuration request is first received by the server is a target user terminal and to send a configuration response message to the target user terminal, the target user terminal is configured to enable the unconfigured device to access a second hotspot of the one or more network hotspot devices corresponding to the target user terminal after receiving the configuration response message; and
accessing the second hotspot of the one or more network hotspot devices.

11. The apparatus of claim 10, wherein the reporting the device information of the unconfigured device to the one or more network hotspot devices through the first hotspot of the one or more network hotspot devices for sending the device information to the server comprises:
accessing the first hotspot of each network hotspot device one by one using first hotspot access information of the first hotspot of each network hotspot device; and
sending the device information of the unconfigured device to each network hotspot device through the first hotspot of each network hotspot device.

12. The apparatus of claim 10, wherein accessing the second hotspot of the target network hotspot device, comprises:
after receiving a first network configuration startup message sent by the target user terminal, accessing a third hotspot of the target network hotspot device;
receiving second hotspot access information of a second hotspot sent by the third hotspot of the target network hotspot device; and
accessing the second hotspot of the target network hotspot device using the second hotspot access information.

13. The apparatus of claim 12, wherein after receiving a first network configuration start message sent by the target user terminal, accessing a third hotspot of the target network hotspot device comprises:
accessing the third hotspot of the target network hotspot device using third hotspot access information of the third hotspot of the target network hotspot device.

14. A non-transitory computer readable medium that stores a set of instructions that is executable by at least one processor of a computer to cause the computer to perform a method for accessing a network hotspot device, the method comprising:
reporting device information of an unconfigured device to one or more network hotspot devices through a first hotspot of the one or more network hotspot devices for sending the device information to a server, wherein one or more user terminals corresponding to the one or more network hotspot devices are configured to send a configuration request for the unconfigured device to the server, the server is configured to determine that one of the one or more user terminals of which the configuration request is first received by the server is a target user terminal and to send a configuration response message to the target user terminal, the target user terminal is configured to enable the unconfigured device to access a second hotspot of the one or more network hotspot devices corresponding to the target user terminal after receiving the configuration response message; and
accessing the second hotspot of the one or more network hotspot devices.

15. The non-transitory computer readable medium of claim 14, wherein the reporting the device information of the unconfigured device to the one or more network hotspot devices through the first hotspot of the one or more network hotspot devices for sending the device information to the server comprises:
accessing the first hotspot of each network hotspot device one by one using first hotspot access information of the first hotspot of each network hotspot device; and
sending the device information of the unconfigured device to each network hotspot device through the first hotspot of each network hotspot device.

16. The non-transitory computer readable medium of claim 14, wherein accessing the second hotspot of the target network hotspot device, comprises:
after receiving a first network configuration startup message sent by the target user terminal, accessing a third hotspot of the target network hotspot device;
receiving second hotspot access information of a second hotspot sent by the third hotspot of the target network hotspot device; and
accessing the second hotspot of the target network hotspot device using the second hotspot access information.

17. The non-transitory computer readable medium of claim 16, wherein after receiving the first network configuration start message sent by the target user terminal, accessing the third hotspot of the target network hotspot device comprises:

accessing the third hotspot of the target network hotspot device using third hotspot access information of the third hotspot of the target network hotspot device.

\* \* \* \* \*